ated Feb. 17, 1959

2,874,162
ETHYNYLPYRIDINE-N-OXIDES AND ETHYNYL-QUINOLINE-N-OXIDES

Jack H. Blumenthal, Plainfield, N. J., assignor to Air Reduction Company, Incorporated, New York, N. Y., a corporation of New York No Drawing. Application February 25, 1957
Serial No. 641,799

15 Claims. (Cl. 260—297)

This invention relates to novel ethynylpyridine-N-oxides and ethynylquinoline-N-oxides and to methods of making same. The compounds which are the subject of the present invention may be represented by the following general formulas:

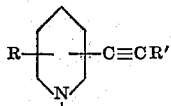

and

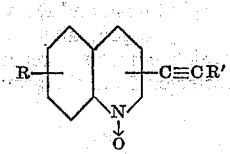

wherein R is hydrogen, an alkyl radical containing from 1 to 4 carbon atoms, such as methyl, ethyl, propyl and butyl, or an aryl radical such as phenyl, tolyl, and xylyl, and R' is hydrogen or a hydrocarbon radical such as alkyl, alkenyl, aryl and alkaryl.

In accordance with my invention, the novel ethynylpyridine-N-oxides and ethynylquinoline-N-oxides may be prepared by reacting a pyridine-N-oxide or a quinoline-N-oxide with an alkali metal acetylide in the presence of a liquid organic sulfoxide reaction medium. The overall reactions may be represented by the following equations:

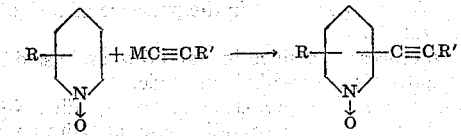

and

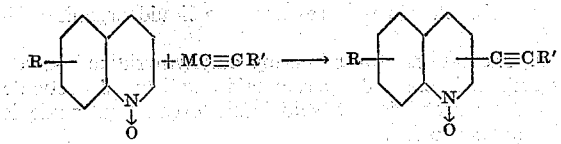

wherein R and R' have the same meaning as that given above and M is an alkali metal such as sodium, lithium, potassium and the like. It will be readily understood that the nature of the alkyl metal acetylide employed will determine the character of the ethynyl group substituted on the pyridine-N-oxide or quinoline-N-oxide. Thus, for example, ethynylpyridine-N-oxide and ethynylquinoline-N-oxide may be prepared, respectively, by the reaction of sodium acetylide (NaC≡CH) and pyridine-N-oxide or quinoline-N-oxide; phenylethynylpyridine-N-oxide or phenylethynylquinoline-N-oxide may be prepared by the reaction, respectively, of sodium phenylacetylide

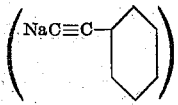

with pyridine-N-oxide or quinoline-N-oxide; 3-buten-1-yne-pyridine-N-oxide may be prepared by the reaction of sodium vinylacetylide

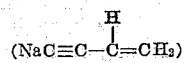

and pyridine-N-oxide; propyn-1-pyridine-N-oxide may be prepared by the reaction of sodium methylacetylide (NaC≡C—CH₃) and pyridine-N-oxide.

I have also found that the reaction of an alkali metal acetylide and pyridine-N-oxide or quinoline-N-oxide should be conducted in an organic sulfoxide reaction medium which is liquid at reaction temperature and contains no functional or reactive groups. Other solvent media have not been found to be effective for this reaction. The preferred organic liquid sulfoxides may be designated by the formula:

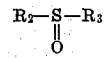

wherein $R_2$ and $R_3$ are the same or different alkyl radicals or may be methylene groups which are bonded together through two or more methylene groups to form a ring structure as in tetramethylene sulfoxide. Suitable organic liquid sulfoxides include dimethyl sulfoxide, diethyl sulfoxide, methyl ethyl sulfoxide, and tetramethylene sulfoxide; although dimethyl sulfoxide is preferred.

The temperature of the reaction will depend upon a variety of factors, including the specific reactants and the particular liquid organic sulfoxide used. Generally, the temperature may vary from about the freezing point of the reacting mixture to a maximum of about 60 C. At temperatures much above 60° C., undesirable side reactions may occur and the yields and conversions decreased thereby. It is preferred practice to conduct the reaction at a temperature of from about 5° to 20° C. Although elevated pressures may be used, there is no necessity for elevated pressures and atmospheric pressure is preferred.

Each of the reactants may be used in stoichiometric amounts in accordance with the equation given above. However, it has been found desirable to use an excess of the acetylide where an alkali metal acetylide (MC≡CH)

is the reactant and to use equimolar amounts where substituted acetylides are employed.

The following specific example will further illustrate this invention:

EXAMPLE

*Preparation of ethynylpyridine-N-oxide*

To 200 cc. of dimethyl sulfoxide were added 66 g. (0.7 mole) of redistilled pyridine-N-oxide. The temperature of the mixture was brought to 6° C. by means of an acetone-Dry Ice bath, and 35 g. (0.73 mole) of powdered sodium acetylide (NaC≡CH) were added portionwise over a period of twenty-five minutes. After all of the sodium acetylide had been added, the reaction temperature was permitted to come to room temperature while the mixture was stirred. The reaction mixture was neutralized with cold, dilute hydrochloric acid, and the resulting mixture was filtered. The filtrate was extracted, portionwise, with 400 cc. of ethyl ether. The ether extract was dried over magnesium sulfate and the ether distilled off. The residue was recrystallized from carbon tetrachloride. The compound, ethynylpyridine-N-oxide, which was obtained had a melting point of 112–115° C. and was in the form of yellow crystals which turned brown on standing. The compound was about 91% pure based on both acetylenic hydrogen and nitrogen analysis:

Calculated for $C_5H_5NO \cdot C\equiv CH$: N, 11.65%; —$C\equiv CH$, 20.8%. Found: N, 10.7%; —$C\equiv CH$, 19.0%.

It will be understood that the foregoing example is merely illustrative and that various modifications thereof can be made without departing from the spirit and scope of this invention. For example, as more fully pointed out hereinabove, various other ethynylpyridine-N-oxides may be obtained by substituting other alkali metal acetylides for acetylide of the example; ethynylquinoline-N-oxides are obtained in similar manner; either pyridine-N-oxide or quinoline-N-oxide or alkyl or aryl substituted quinoline-N-oxides or pyridine-N-oxides may be employed; any of a variety of liquid organic sulfoxides are suitable as the reaction medium; and still other variations will suggest themselves to those skilled in the art.

The ethynylpyridine-N-oxides and ethynylquinoline-N-oxides of this invention are suitable for a variety of uses, such as precursors for the preparation of corresponding vinylpyridine-N-oxides and vinylquinoline-N-oxides. For example, vinylpyridine-N-oxides may be obtained by the semi-hydrogenation of ethynylpyridine-N-oxide in the presence of a suitable hydrogenation catalyst such as palladium, nickel or platinum. In like manner, vinylquinoline-N-oxides may be obtained by the semi-hydrogenation of ethynylquinoline-N-oxides. The metal hydrogenation catalyst may be supported on a carrier such as charcoal, silica, activated alumina and the like. The vinylpyridine-N-oxide and vinylquinoline-N-oxide derivatives, which are thus obtained, may be used for the preparation of polymers and copolymers as described in United States Letters Patent No. 2,749,349 to Francis E. Cislak, issued June 5, 1956. The ethynylpyridine-N-oxides and ethynylquinoline-N-oxides may also be used as an intermediate for the preparation of pharmaceuticals and pesticides such as fungicides, insecticides, herbicides; etc. Still further, the novel ethynylpyridine-N-oxides and ethynylquinoline-N-oxides of this invention may be used as additives for chlorinated hydrocarbon solvents such as trichloroethylene, perchlorethylene and the like to stabilize such chlorinated hydrocarbon solvents from decomposition due to exposure to heat and light, and to inhibit the corrosive effects of the degradation products of such decomposition. For example, small amounts, i. e. about 0.01 to 1.0 percent by weight of an ethynylpyridine-N-oxide or ethynylquinoline-N-oxide may be added to a chlorinated hydrocarbon solvent, e. g. trichlorethylene, to obtain these stabilizing effects.

The invention is not to be limited except as defined in the appended claims.

What is claimed is:

1. Ethynylpyridine-N-oxides and ethynylquinoline-N-oxides represented by a formula selected from the group consisting of

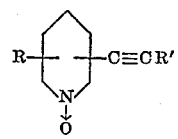

and

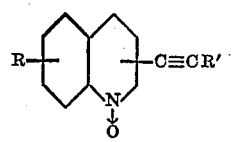

wherein R is a member of the group consisting of hydrogen, an alkyl radical containing from 1 to 4 carbon atoms, and a monocyclic hydrocarbon aryl radical, and R' is a member of the group consisting of hydrogen, lower alkyl, lower alkenyl, monocyclic hydrocarbon aryl.

2. Ethynylpyridine-N-oxide.
3. Phenylethynylpyridine-N-oxide.
4. 3-buten-1-yne-pyridine-N-oxide.
5. Propyne-1-pyridine-N-oxide.
6. The process for preparing ethynylpyridine-N-oxides and ethynylquinoline-N-oxides represented by a formula selected from the group consisting of

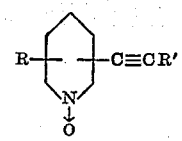

and

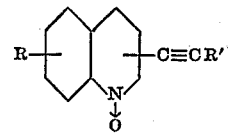

wherein R is a member of the group consisting of hydrogen, an alkyl radical containing from 1 to 4 carbon atoms, and a monocyclic aryl radical, and R' is a member of the group consisting of hydrogen, alkyl, alkenyl, aryl and alkaryl radicals, which comprises reacting a compound having a formula selected from the group consisting of

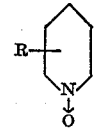

and

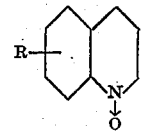

with an alkali metal acetylide of the formula $MC\equiv CR'$ where M is an alkali metal in the presence of a liquid organic sulfoxide.

7. The process as defined in claim 6 wherein said liquid organic sulfoxide is dimethyl sulfoxide.

8. The process for preparing ethynylpyridine-N-oxide which comprises reacting pyridine-N-oxide with an alkali metal acetylide of the formula $MC\equiv CH$, wherein M is an alkali metal, in the presence of a liquid organic sulfoxide.

9. The process for preparing ethynylpyridine-N-oxide as defined in claim 8 wherein said alkali metal acetylide is sodium acetylide and said liquid organic sulfoxide is dimethyl sulfoxide.

10. The process for preparing phenylethynylpyridine-N-oxide which comprises reacting an alkali metal phenylacetylide with pyridine-N-oxide in the presence of an organic liquid sulfoxide.

11. The process for preparing 3-buten-1-yne-pyridine-N-oxide which comprises reacting an alkali metal vinyl acetylide with pyridine-N-oxide in the presence of an organic liquid sulfoxide.

12. The process for preparing propyne-1-pyridine-N-oxide which comprises reacting an alkali metal methyl acetylide with pyridine-N-oxide in the presence of an organic liquid sulfoxide.

13. The process for preparing phenylethynylpyridine-N-oxide as defined in claim 10 wherein said liquid organic sulfoxide is dimethyl sulfoxide.

14. The process for preparing 3-buten-1-yne-pyridine-N-oxide as defined in claim 11 wherein said liquid organic sulfoxide is dimethyl sulfoxide.

15. The process for preparing propyne-1-pyridine-N-oxide as defined in claim 12 wherein said liquid organic sulfoxide is dimethyl sulfoxide.

References Cited in the file of this patent

UNITED STATES PATENTS 2,749,349    Cislak ------------------ June 5, 1956